3,085,095
PROCESS OF DEHYDROGENATION OF o-AMINO BIPHENYLS AND DIPHENYL AMINES TO PRODUCE CARBAZOLES
Thomas D. Nevitt and Herman S. Seelig, Valparaiso, Ind., assignors to Standard Oil Company, Chicago, Ill., a corporation of Indiana
No Drawing. Filed June 24, 1960, Ser. No. 38,422
3 Claims. (Cl. 260—315)

This invention relates to vapor phase catalytic dehydrogenation and more specifically pertains to the vapor phase catalytic dehydrogenation of o-amino biphenyls and diphenylamines to produce carbazoles.

Carbazole may be obtained from coal tar by various methods which are, in general, complex and expensive. This source of carbazole is somewhat limited. Carbazole is of commercial importance as an intermediate in the dyestuff industry. Carbazole also reacts readily with acetylene to give N-vinyl carbazole which is an excellent monomer for the preparation of thin polymeric films of exceptional dielectric properties and high temperature properties.

Since the natural source of carbazole has been rather limited, synthetic preparative methods have long been sought. Many of the proposed syntheses of carbazole are of only academic interest and would not be suitable for a commercial synthetic preparative process. It has been proposed to pass vapors of o-amino biphenyl or diphenylamine through tubes heated to redness, over platinum wire, over Cu or magnesium oxides, over $V_2O_5$ at 600 to 625° C., over heated glass beads, or over platinum or platinum oxide on supports such as a platinum-charcoal catalyst. Many of these processes result in high coke and tar formations due to cracking of the feed. The deposit of coke and tars on the catalyst quickly deactivates the catalyst.

A catalytic vapor phase process has been discovered for the synthesis of carbazoles. This process comprises passing a mixture of vapors of benzene and an o-amino diphenyl or benzene and a diphenylamine over an alkalized chromia on alumina catalyst. This use of this catalyst has many advantages over the use of the previously suggested catalysts. Under the reaction conditions this catalyst is not as active a cracking catalyst as would be the various platinum catalysts proposed for the preparation of carbazole. The alkalized chromia on alumina catalyst is not deactivated as rapidly as are the proposed platinum catalysts. Also the alkalized chromia on alumina catalyst can be reactivated easily especially when employed in a fluidized bed. In addition, the carbazole product resulting from the process of this invention employing alkalized chromia on alumina catalyst is much lighter in color than carbazole produced in the presence of the various platinum catalysts.

Typically the preferred alkalized chromia on alumina catalyst employed in the process of this invention contains on a weight basis 18 percent chromia, 4 percent silica, 4 percent potassium as $K_2O$ and 74 percent alumina. These components are desirably present in the range of from 15 to 20 percent chromia, 2 to 6 percent silica, 2 to 6 percent $K_2O$ and the remaining 68 to 81 percent alumina. Suitable alkalized chromia on alumina catalysts can contain 10 to 25 percent chromia, 1 to 10 percent $K_2O$ or $Na_2O$, 1 to 10 percent $SiO_2$ and 45 to 88 percent alumina. The alkalized chromia on alumina catalysts have been employed for other dehydrogenation processes and their preparations are also known. However, their use and the advantages of their use in the specific dehydrogenation and coupling process involved in the preparation of carbazole products have not been previously reported. Hence, the use of alkalized chromia on alumina in the process of this invention to produce carbazole products is a new route to the preparation of these very useful chemical products.

More specifically, the process of this invention comprises passing a gasiform mixture of benzene and a diphenylamine or benzene and an o-amino biphenyl over the alkalized chromia on alumina catalyst at a temperature in the range of 900 to 1200° F., condensing the resulting gasiform reaction mixture and recovering the carbazole product from the condensate. The catalyst can be employed as a powder, in the form of pills or pellets and the like. The powder form is preferably employed in a fluidized catalyst bed system. An inert gas can be carbureted with the benzene-diphenylamine or benzene-o-biphenyl mixtures and passed into a bed of alkalized chromia on alumina maintained as a fluid bed by the inert gas. Also the inert gas and the mixtures of benzene and amine reactant can be separately fed to the fluidized bed. Employing this fluidized catalyst technique has many advantages. Since a portion of the fluidized bed, the lower dense phase, is continuously removed to be reheated, it can also be readily regenerated on a continuous basis before returning to the catalytic reaction zone. Regeneration of the catalyst may be accomplished by heating the catalyst in a gas stream containing 0.5–5% oxygen in an inert gas such as nitrogen. The concentration of oxygen is that just sufficient to maintain a temperature of about 1200° F. A temperature above 1400° F. destroys the catalyst and should be avoided. Regenerated catalyst appears to be more active than fresh catalyst.

The pill or pelleted form of the alkalized chromia on alumina catalyst is useful in a fixed bed system where a reaction zone contains a fixed bed of catalyst and the catalyst is heated by external indirect heat exchange.

A modification of the process of this invention to extend the active life of the catalyst comprises adding 2 to 10 moles, preferably 3 to 5 moles, of hydrogen per mole of amine reactant. Although hydrogen is formed as a by-product, the introduction of additional hydrogen appears to extend the catalyst activity life.

The process of this invention is illustrated by the following specific examples.

*Examples I to III*

The catalytic reactor is a glass tube about 0.5 inch internal diameter containing a fixed catalyst bed of 25 cubic centimeters in volume (about 20 centimeters long) preceded by a glass bead preheat section about 12 centimeters long. The reactor tube is heated externally over the length of the tube including the glass bead preheat zone and catalyst bed to provide the temperatures hereinafter indicated. The amine reactant is dissolved in benzene to provide 200 grams of amine reactant per liter of benzene. This mixture is fed to the reactor at a space velocity of 1.8 liters per hour per liter of catalyst. The gasiform reaction mixture from the reactor is passed into a condenser. The condensate, a solution of carbazole in benzene, is obtained. Carbazole may be recovered from the solution by cooling and filtering. Cooling can be accomplished by flashing off part of the solvent in vacuum or by other means. For example, a product containing about 160 grams benzene, 31 grams diphenylamine and 8 grams carbazole was cooled to 32° F. and filtered 7.3 grams of carbazole was recovered. The results of three preparations of carbazole are tabulated below:

| Example | Amine | Temperature, °F. | Carbazole Yield,[1] percent |
|---|---|---|---|
| I | Diphenylamine | 1,020 | 10 |
| II | o-Amino-biphenyl | 1,020 | 63 |
| III | do | 950 | 25 |

[1] Based on amine.

In a similar manner 2,7-dimethyl carbazole may be prepared employing 2-amino-4,4'-dimethyl biphenyl or p,p'dimethyl diphenylamine, 5-methyl carbazole may be prepared from N-(m-tolyl) N-phenylamine or 2-amino-6-methyl biphenyl. Any methyl derivative of o-aminobiphenyl or diphenylamine which has an unsubstituted ring carbon in the remaining ortho positions may be employed to prepare methyl carbazole products by the process of this invention. Hence, each ring can contain 0 to 4 methyl groups. The amine reactants to be dehydrogenated have the formulae:

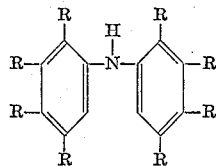

or

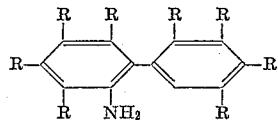

wherein the R groups are methyl or hydrogen.

What is claimed is:
1. A method for preparing a carbazole product which comprises passing a gasiform mixture of benzene and an aromatic amine selected from the group consisting of:

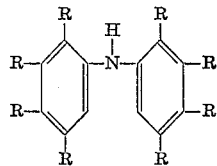

and

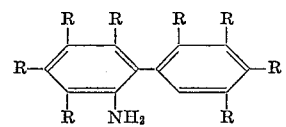

wherein R is selected from hydrogen and methyl, in contact with an alalized chromia on alumina catalyst at a temperature in the range of from 900 to 1200° F. and recovering a carbazole product from the resulting gasiform mixture.

2. A method for preparing carbazole which comprises passing a gasiform mixture of benzene and diphenylamine in contact with an alkalized chromia on alumina catalyst at a temperature in the range of from 900 to 1200° F. and recovering carbazole from the resulting gasiform mixture.

3. A method for preparing carbazole which comprises passing a gasiform mixture of benzene and o-amino-biphenyl in contact with an alkalized chromia on alumina catalyst at a temperature in the range of from 900 to 1200° F. and recovering carbazole from the resulting gasiform mixture.

References Cited in the file of this patent
UNITED STATES PATENTS
2,921,942 Grotta _____ Jan. 14, 1960

OTHER REFERENCES
Von Graebe: Liebigs Annalen, vol. 167 (1873), page 129.
Morgan et al.: J. Soc. Chem. Ind., vol. 57 (1938), pages 358–360.
Lohse: Catalytic Chemistry, page 137 (1945) (Chemical Publishing Co.).